United States Patent
Haveliwala et al.

(10) Patent No.: US 9,805,116 B2
(45) Date of Patent: *Oct. 31, 2017

(54) SYSTEM AND METHOD FOR PERSONALIZED SNIPPET GENERATION

(71) Applicant: GOOGLE INC., Mountain View, CA (US)

(72) Inventors: Taher H. Haveliwala, Fremont, CA (US); Sepandar D. Kamvar, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/221,837

(22) Filed: Jul. 28, 2016

(65) Prior Publication Data
US 2016/0335346 A1    Nov. 17, 2016

Related U.S. Application Data

(63) Continuation of application No. 14/154,071, filed on Jan. 13, 2014, now Pat. No. 9,418,118, which is a (Continued)

(51) Int. Cl.
G06F 17/30 (2006.01)

(52) U.S. Cl.
CPC .. G06F 17/30719 (2013.01); G06F 17/30011 (2013.01); G06F 17/3053 (2013.01); (Continued)

(58) Field of Classification Search
CPC ......... G06F 17/30719; G06F 17/30011; G06F 17/3053; G06F 17/30675; G06F 17/30702; G06F 17/30867
See application file for complete search history.

(56) References Cited

U.S. PATENT DOCUMENTS 6,144,944 A   11/2000 Kurtzman, II et al.
6,275,820 B1  8/2001 Navin-Chandra et al.
(Continued)

OTHER PUBLICATIONS

Notice of Allowance received for U.S. Appl. No. 11/107,490, dated Sep. 26, 2013, 9 pages.

(Continued)

*Primary Examiner* — Apu Mofiz
*Assistant Examiner* — Jared Bibbee
(74) *Attorney, Agent, or Firm* — Brake Hughes Bellermann LLP

(57) ABSTRACT

A method of producing search results is disclosed. The method comprises, at a computerized search engine system distinct from a client system: receiving a search request associated with a user from the client system, the search request having one or more search terms; obtaining a user profile corresponding to the user, where the user profile is generated based in part on the user's prior computing activities, comprising one or more of browsing, searching, and messaging; obtaining search results for the search request; generating a personalized snippet for at least one of the search results in accordance with the obtained user profile, the snippet comprising a text portion of the search result chosen based on at least one or more search terms and one or more terms of the obtained user profile; and transmitting the search results and personalized snippet to the client system for display.

18 Claims, 6 Drawing Sheets

Related U.S. Application Data continuation of application No. 11/107,490, filed on Apr. 14, 2005, now Pat. No. 8,631,006.

(52) U.S. Cl.
CPC .. *G06F 17/30675* (2013.01); *G06F 17/30702* (2013.01); *G06F 17/30867* (2013.01)

(56) References Cited

U.S. PATENT DOCUMENTS

| | | | | |
|---|---|---|---|---|
| 6,327,590 | B1* | 12/2001 | Chidlovskii | G06F 17/30867 707/734 |
| 6,701,310 | B1* | 3/2004 | Sugiura | G06F 17/30864 |
| 7,092,901 | B2* | 8/2006 | Davis | G06F 17/30864 705/26.1 |
| 7,165,091 | B2* | 1/2007 | Lunenfeld | G06F 17/30864 707/E17.108 |
| 7,418,447 | B2* | 8/2008 | Caldwell | G06Q 30/02 705/26.1 |
| 8,631,006 | B1 | 1/2014 | Haveliwala et al. | |
| 2003/0009440 | A1* | 1/2003 | Inaba | G06F 17/30867 |
| 2004/0034652 | A1* | 2/2004 | Hofmann | G06F 17/30699 |
| 2004/0236721 | A1* | 11/2004 | Pollack | G06F 17/30699 |
| 2004/0267723 | A1 | 12/2004 | Bharat | |
| 2005/0240580 | A1* | 10/2005 | Zamir | G06F 17/30867 |
| 2006/0074883 | A1* | 4/2006 | Teevan | G06F 17/30867 |
| 2006/0112079 | A1* | 5/2006 | Holt | G06F 17/30867 |
| 2006/0248059 | A1* | 11/2006 | Chi | G06F 17/30867 |
| 2014/0129542 | A1 | 5/2014 | Haveliwala et al. | |

OTHER PUBLICATIONS

Non-Final Office Action received for U.S. Appl. No. 14/154,071, dated May 15, 2015, 14 pages.
Final Office Action received for U.S. Appl. No. 14/154,071, dated Sep. 25, 2015, 15 pages.
Notice of Allowance received for U.S. Appl. No. 14/154,071, dated Apr. 11, 2016, 8 pages.
Sugiyama et al., "Adaptive Web Search Based on User Profile Constructed without Any Effort from Users", Proceedings of the 13th International Conference on World Wide Web, May 17-22, 2004, pp. 675-684.
Speretta et al., "Personalized Search Based on User Search Histories", Proceedings of the 2005 IEEEIWIC/ACM International Conference on Web Intelligence, 2005, pp. 622-628.
Amendment after Decision on Appeal for U.S. Appl. No. 11/107,490, filed on Sep. 9, 2013, 7 pages.

\* cited by examiner

600

| 602 | 604 |
|---|---|
| Topic 1 | Weight 1 |
| Topic 2 | Weight 2 |
| Topic 3 | Weight 3 |
|  |  |
| Topic P | Weight P |

| 702 | 704 |
|---|---|
| Term 1 | Score 1 |
| Term 2 | Score 2 |
| Term 3 | Score 3 |
|  |  |
| Term P | Score P |

Figure 7

SYSTEM AND METHOD FOR PERSONALIZED SNIPPET GENERATION

CROSS REFERENCE TO RELATED APPLICATIONS

This application is a continuation of U.S. patent application Ser. No. 14/154,071, filed Jan. 13, 2014 which is a continuation of U.S. patent application Ser. No. 11/107,490, filed Apr. 14, 2005, the disclosures of which are incorporated by reference herein in their entirety.

TECHNICAL FIELD

The present invention relates generally to producing snippets of text.

BACKGROUND

A search engine is a system or computer program that locates documents corresponding to user-specified search queries. Search engines may be implemented on a single computer or on multiple computers. The documents searched by a search engine may be stored on a single computer or on host servers in a network of computers, such as the Internet, an intranet, or extranet. A search engine may include an index of terms found in the set of documents that can be searched using the search engine. In addition, the search engine may include a copy of the document contents, or a portion of the document contents, to enable the search engine to return document snippets along with lists of documents matching a search query. When a user submits a search query having one or more terms, the search engine locates relevant documents (e.g., by searching the index for documents that satisfy the query), and provides an ordered list of matching documents, typically including for each listed document the document's address or URL (uniform resource locator) and the title of the document. Some search engines also return snippets of an appropriate subset of each listed document. A snippet is a portion of a document deemed relevant to a search query (e.g., text surrounding the matching and/or relevant terms in the document). The snippets serve to aid the user in determining which, if any, of the listed documents may be of interest to the user.

SUMMARY

According to some embodiments of the invention, a method of producing snippets includes identifying at least one item having a content and generating a personalized snippet for the item in accordance with information associated with the user.

BRIEF DESCRIPTION OF THE DRAWINGS

For a better understanding of the nature and embodiments of the invention, reference should be made to the description of embodiments below, in conjunction with the following drawings in which like reference numerals refer to corresponding parts throughout the figures.

FIG. 6 is a depiction of one type of user profile in accordance with some embodiments of the present invention.

FIG. 7 is a depiction of another type of user profile in accordance with some embodiments of the present invention.

DETAILED DESCRIPTION

When a user enters a search request, a number of documents may match or be relevant to the search query with varying degrees of certainty. Snippets of text surrounding a portion of the document matching the search query are routinely provided by search systems to aid the user in identifying documents of interest. As described below, snippets can be generated based in part on a user's profile. Basing a snippet in part on a user's profile may increase a likelihood that the snippet will contain information that is relevant to the user. The concepts described herein may also be extended to other situations where snippets are generated such as directory listings or message listings.

In some embodiments, selected search results in a set of search results can be boosted in accordance with their similarity to the user's profile. However, such boosting may not be obvious to the user where snippets are based solely on search terms. Accordingly, personalized snippets can be provided along with these boosted search results based in part on a user's profile.

Figure 1:
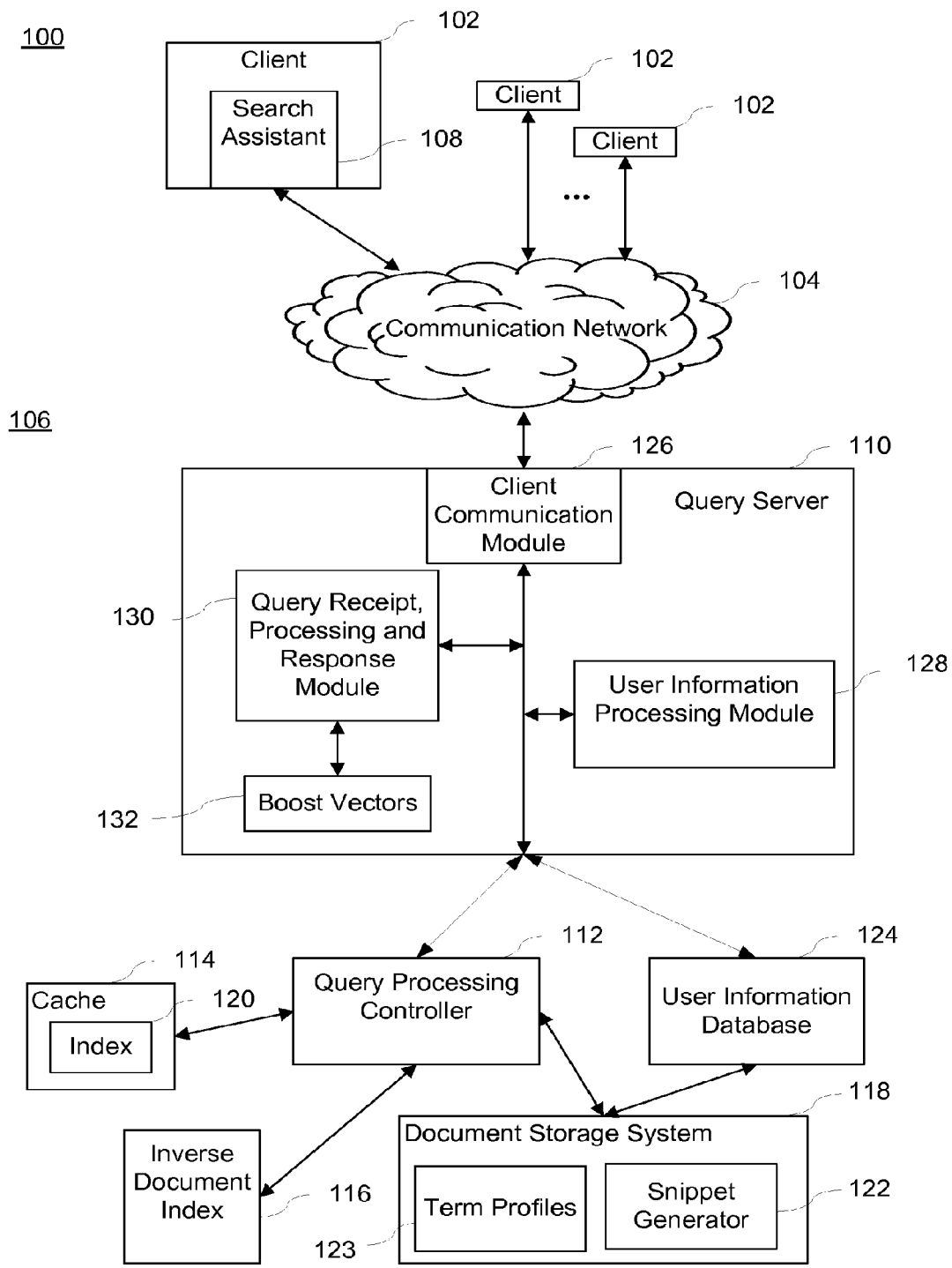
FIG. 1 is a schematic diagram of a system that generates personalized snippets in accordance with some embodiments of the present invention.

FIG. 1 illustrates an exemplary system 100 which has the ability to generate personalized snippets in response to a search request. The system 100 includes one or more clients 102, a communication network 104, and a search engine 106. The clients 102 are connected to the search engine 106 via the communication network 104. A user enters a search request into a search assistant 108 (e.g., a browser) running on a client 102. The search assistant 108 transmits the search request to the search engine 106 for processing. The search engine 106 searches its index of documents for documents that match or are otherwise relevant to the search request, and produces an ordered list of documents (if any) that match the search request. Other, known techniques can also be used to identify matching or relevant documents. The term "document" as used throughout this specification can refer to any number of different types of objects that may be identified as matching or relevant to a search request including, but not limited to, web pages, images, single and multi-media files, and advertisements.

The search engine 106 can be a search engine for locating documents on a single computer and/or network of computers, such as the Internet, an intranet, or an extranet. In addition, the methodology described herein may also be used in implementations where only portions of documents, such as titles and abstracts, are stored in the database of the search engine 106.

The search engine 106 may include one or more data centers, each housing a backend system. If the search engine includes multiple data centers, the data centers may be widely dispersed from one another, such as across the continental United States. Search queries submitted by users at one of the clients 102 to the search engine 106 are routed to an appropriate backend system using the Domain Name System (DNS), based on current load, geographic locality, and/or system availability.

Each backend system includes one or more query servers, such as query server 110, coupled to the communications network 104. The communications network 104 may be the Internet, but may also be any local area network (LAN), wide area network (WAN), or other network, such as a wireless network. In some embodiments, each query server 110 is a Web server that receives search query requests and delivers search results in the form of web pages via HTTP, XML or similar protocols. Alternatively, if the query server 110 is used with a LAN, the server may be an intranet and/or extranet server. In essence, the query servers, such as query server 110, are configured to control the search process, including for example searching a document index, and analyzing and formatting the search results.

Each backend system also includes one or more query processing controllers, such as query processing controller 112, coupled to the multiple query servers, such as the query server 110. Each of the query processing controllers 112 may be coupled to a cache 114, an inverse document index 116, and a document storage system 118. Each query processing controller 112 is configured to receive requests from one or more of the query servers 110, and to transmit the requests to the cache 114, the inverse document index 116, and the document storage system 118.

The cache 114 is used to increase search efficiency by temporarily storing previously located search results. The efficiency and cost of performing a search is dependent on a number of factors, such as the various combinations of terms and/or keywords used in the search query, the length of time spent on the search, and the number of documents indexed. The average response time and cost of a search is lowered by storing the search results of previously requested search queries in the temporary storage or cache 114 of the search engine 106. The cache 114 may include an index 120 for mapping a search query to a cache entry that stores previously located search results for the search query. Of course, if the cache 114 does not contain an entry for the search query, the index 120 will not contain an entry corresponding to the search query and will not map the search query to a cache entry.

Rank values or scores for the documents in the search results can be conveyed to the query processing controller 112 and/or the query server 110, and used to construct an ordered search result list. Once the query processing controller 112 constructs the ordered search result list, it transmits to the document storage system 118 a request for snippets for all or an appropriate subset of the documents in the ordered search list. For example, the query processing controller 112 may request snippets for the first fifteen or so of the documents in the ordered search result list. The document storage system 118 constructs snippets based on at least the search query and user-related information (e.g., as may be stored in a user profile), and returns the snippets to the query processing controller 112. The query processing controller 112 then returns a list of located documents and snippets back to the query server 110. In some embodiments, the snippets are stored in the cache server 114 along with the cached results. As a result, in these embodiments the query processing controller 112 only requests snippets for documents for which it is unable to obtain valid cached snippets from the cache server 114 for a particular user. It is not necessary that the ordered set be determined prior to snippets being generated. For example, snippets can be generated in parallel with the construction of the ordered set.

A snippet generator 122 in the document storage system 118 constructs snippets (described in more detail below) using the search query and the profile of the user who submitted the query, if such profile is available. Term profiles 123 contain, according to some embodiments, profiles for certain terms as described below. The user information database 124 stores one or more user profiles, where the user profiles contain information about a user such as the user's preferences with respect to certain types or categories of information and/or terms. Alternatively, or in addition to, a user profile can be stored in a cookie stored on a user's computer. Such user profile can be provided to the query server 110 as part of a search request. The user profiles can be created in a variety of ways, such as by receiving information from the user, and/or by inferring information about the user from the user's computing activities such as browsing, searching, messaging, and use of various software applications.

The query server 110 has a client communication module 126 for communicating, using the communication network 104, with one or more of the clients 102. The query server 110 also may have a user information processing module 128, a query receipt, processing, and response module 130, and in some embodiments, one or more search boost vectors 132. The user information processing module 128 may, among other things, interact with user information database 124 to store user profiles or other user-related information.

The query receipt, processing, and response module 130 may in some embodiments select one or more search boost vectors 132. The search boost vectors 132 are used to adjust the rankings of documents listed in the query search results. The search boost vectors to be used in the processing of a particular search query may be selected based on user-related information. In some embodiments, when the search query is submitted from a web site or web page having one or more content site profiles, one or more search boost vectors may be selected based on the one or more content site profiles of the web site or web page from which the search query was submitted. Using the selected one or more boost vectors, the query receipt, processing, and response module 130 may boost one or more of the search results, i.e., the rankings of one or more documents in the list of located documents. The query server 110 then transmits the search results, or a portion of the search results, to the user requesting the search.

Figure 2:
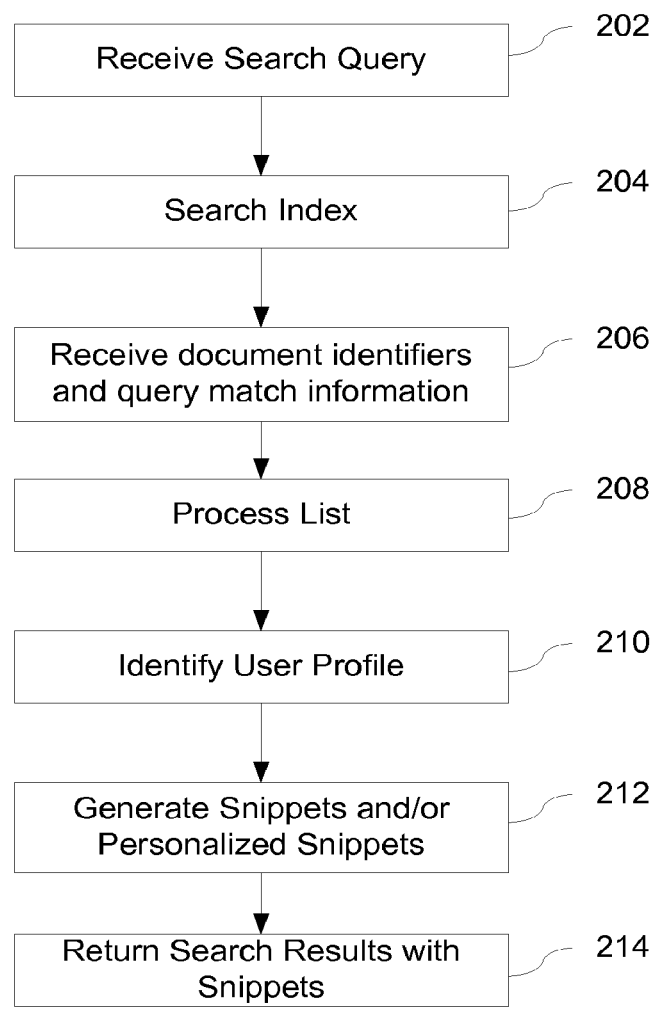
FIG. 2 is a flow chart for a process for generating personalized snippets for a set of search results in accordance with some embodiments of the present invention.

Referring to FIG. 2, an exemplary embodiment for generating personalized snippets is described. A search query is received from a requestor (202) and an index of documents is searched to generate a list of documents that match or are relevant to the search query (204). The search query can be altered (e.g., by expanding, modifying, adding, or removing query terms) in order to identify additional matching or relevant information. The search query can include terms or constraints related to information about the documents (e.g., meta-data) including, but not limited to document dates, document types, document sizes, and document owners. The generated list of documents is received by, for example, the query processing controller 112 along with query match information such as a query score (206). The list is then processed to, for example, sort the list of document identifiers, truncate the list to only include a predetermined number of document identifiers, such as the top 1000 documents, eliminate duplicates from the list, and/or remove non-relevant document identifiers (208).

A user profile of the requestor who submitted the search query is identified (210). For example, the identified user profile may be a profile stored in a user information database 124. Alternatively, a user profile can be stored on the client 102, in, for example, a cookie. Personalized snippets for all or a portion of the documents on the list are generated (212). The snippets are then returned to the search requestor (214). It should be noted that the process shown in FIG. 2 may be performed in many computational contexts, including computational contexts quite different from the one shown in FIG. 1.

Snippets are generated by snippet generator 122, based on a number of factors in an attempt to produce text that is relevant to the user and aid the user in determining whether to take a more detailed look at the corresponding search result. In some embodiments, various portions of text from the documents are examined and a snippet scoring function is used to choose the text portion (or portions) with a highest snippet score. In some embodiments, the evaluated text portion is a moving window that is scanned across the document. The moving window may have a static or a variable length. In some embodiments, more than one text portion can be selected and the generated snippet can be a combination of one or more text portions. Scanning of the window can be terminated prior to reaching the end of the document when a snippet encompassing all the query terms is identified, or other scanning termination criteria are satisfied.

Factors which may increase or decrease a snippet score for a text portion include how many of the search terms are present (e.g., a density value of the search terms), certain meta information about the text portion (e.g., HyperText Markup Language (HTML) tags), and whether the text portion includes text that is possibly boiler plate (e.g., menu items), as well as other factors. Where multiple text portions are combined, the snippet scoring factors can include factors that take into account whether there is any overlap between the text portions to be combined and factors that favor combining text portions to obtain the highest number of search terms. A text portion can be increased in length to increase the snippet score. In some embodiments, the snippet score is based on a number of intermediate scores based on those factors mentioned above and others. The terms of the search query can have different weights according to a determined importance to the search query. Accordingly, the search terms are given different weights when determining a snippet score. Profile terms can be added to the search terms provided to the snippet generator 122, where the profile terms are based on the user profile of the user who submitted the query. The profile terms can have weights associated with them. The profile terms can be treated as though they are additional search terms with equal importance in generating the snippet. Alternatively, the profile terms can be treated like additional search terms, but are accorded less importance than the search terms in determining the snippet. An importance of a profile term in generating the snippet can be provided in accordance with the term's profile similarity score.

Figure 3:
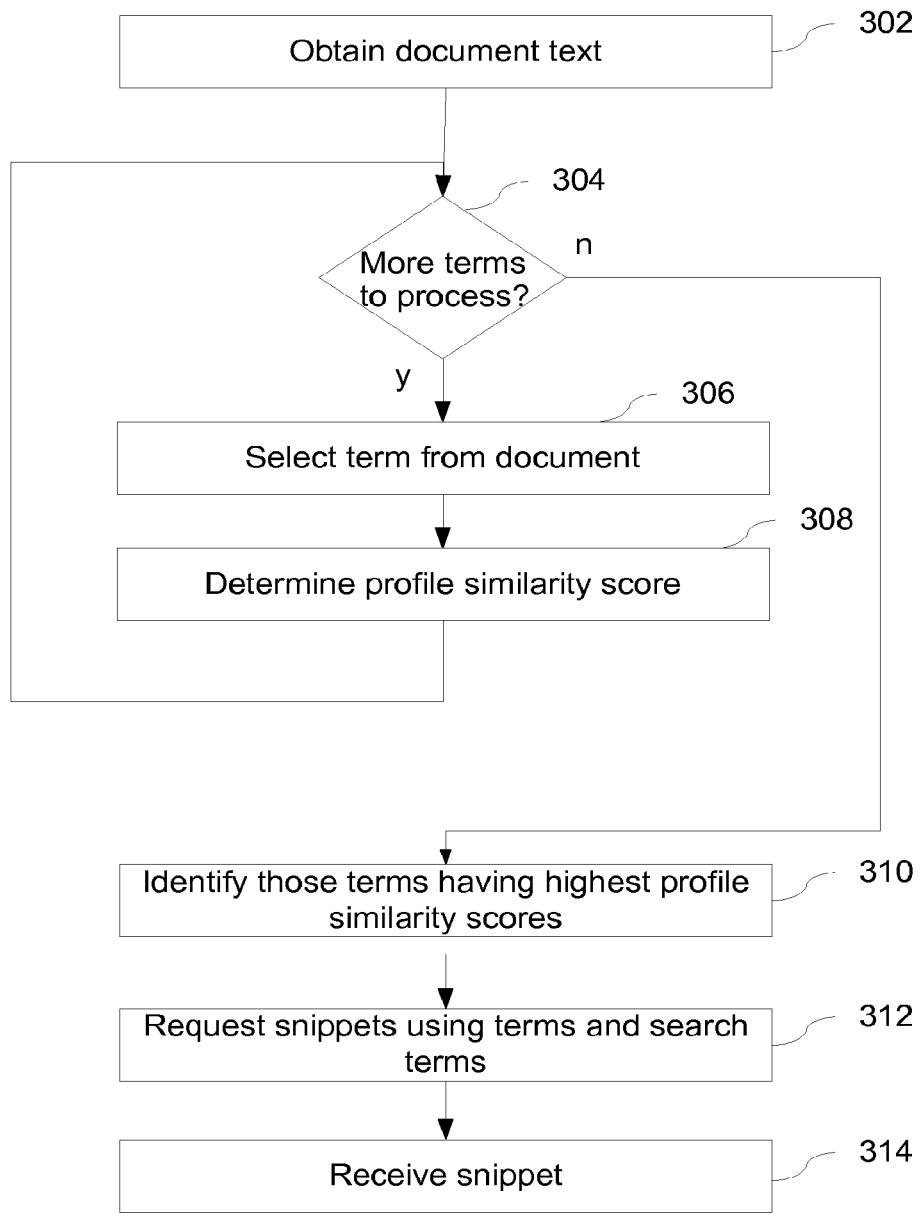
FIG. 3 is a flow chart for a process for obtaining profile scores for one or more terms of a document in accordance with some embodiments of the present invention.

Referring to FIG. 3, an embodiment for identifying profile terms in search results relevant to a user's profile is described. Although described using a single word as a term, it should be understood that the same techniques described herein apply equally well to terms comprising word phrases and/or groups of words. The content (e.g., text) of the search result document is obtained (302). While there are still terms in the document to process (304-*y*), the next term is identified from the document (306) and a profile similarity score is determined (308). Exemplary ways to determine a profile similarity score for a term are described below with reference to FIGS. 4 and 5. After profile similarity scores are determined for each of the terms (304-*n*), then those terms having the highest profile similarity scores are identified (310). Those terms having the top N highest scores are identified, where N is an integer (e.g., 5, or more generally a value between 2 and 10). Alternatively, those terms having a profile similarity score greater than a threshold are identified. The list of terms having a profile similarity score greater than the threshold is truncated, if necessary, so as to limit the length of the list to N terms. Snippets are then requested using the search terms and the just-identified profile terms (312). The snippets are generated as described above, and returned (314), for example, to query processing controller 112.

Figure 4:
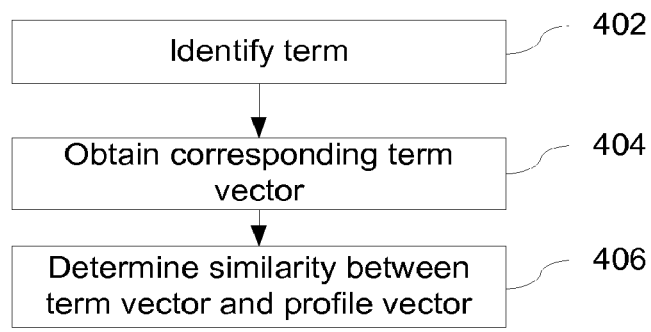
FIG. 4 is a flow chart for a process for determining a similarity score in accordance with some embodiments of the present invention.

Referring to FIG. 4, some embodiments for determining a profile similarity score for a term are described. Initially, a term is identified (402) from the document so that the profile similarity score may be determined for that term. Terms can have a corresponding term vector which provides a "profile" for the term. The term profile comprises one or more topics and an associated weight for each topic. The weight indicates the strength of an association of a particular category or topic to the term (e.g., topics such as those found in the Open Directory Project http://dmoz.org). For example, the term "wheel" might be associated with a number of different topics (e.g., automobile, cheese) but may be more important to some topics than to others, and might not be associated with some topics at all. The topics and weights associated with a term may be generated from a number of different analysis techniques. The topic/weights can be a vector in N dimensional space, where N is the number of topics over which any given term may be categorized. After the term's corresponding term vector is identified (404), the term vector is then compared to the profile of the user to determine a similarity score for the term in relation to the user profile (406). The profile of the user can also expressed, at least in part, as one or more pairs of topics and weights, where a topic's weight indicates the strength of the topic as associated to the user. As mentioned earlier, the user profile may be generated in a number of ways and take into account various computing activities performed by the user. A similarity score between the term profile and the user profile can be obtained by determining a distance between the two profiles (e.g., performing a dot product of the two vectors).

Figure 5:
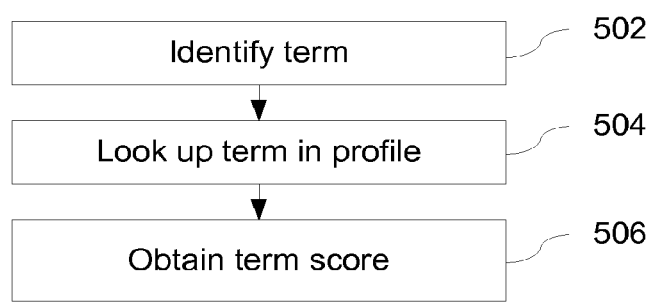
FIG. 5 is a flow chart for another process for determining a similarity score in accordance with some embodiments of the present invention.

Referring to FIG. 5, other embodiments for determining a profile similarity score for a term are described. The user profile can be expressed, at least in part, as one or more terms which are associated with the user (i.e., one or more terms which relate to the user's interests or preferences). The user profile can be generated in any number of ways, such as receiving user input and/or inferring user preferences as described above. The user profile can, in some cases, be based on the user's employer, the user's membership in a group, or the web site or service used by the user to submit the search query being processed. Each term can have an associated score, or weight, indicating the term's importance in relation to the user's profile. After obtaining the term for which a profile similarity score is sought (502), the presence or absence of the term in the user's profile is checked (504). If the term is present, the profile similarity score is read from the user's profile (506). For terms absent from the user's profile, a default score or weight can be provided (e.g., zero).

FIG. 6 provides an exemplary embodiment of a topic/weight vector 600 which can be used to represent a user profile and/or a term profile. One or more topics 602 each have an associated weight 604. The number (P) of topic/weight pairs in the user or term profile can vary according to different embodiments. In some embodiment, the number P of topic/weight pairs in the profile is limited to a predefined maximum number of pairs.

FIG. 7 provides an exemplary embodiment of a term/score table 700 which can be used to represent a user profile. One or more terms 702 each have an associated score 704. The number of term/score pairs can vary according to different embodiments. For example the number of term/score pairs can depend on the amount of information available about the user, or the diversity of the user's interests. The number of term/score pairs can furthermore be limited to a predefined maximum number of pairs. When a profile similarity score is to be determined for a term, the term is looked up in the term/score table 700 of a user profile. If the term is present in the table 700, then the associated score 704 is obtained.

Figure 8:
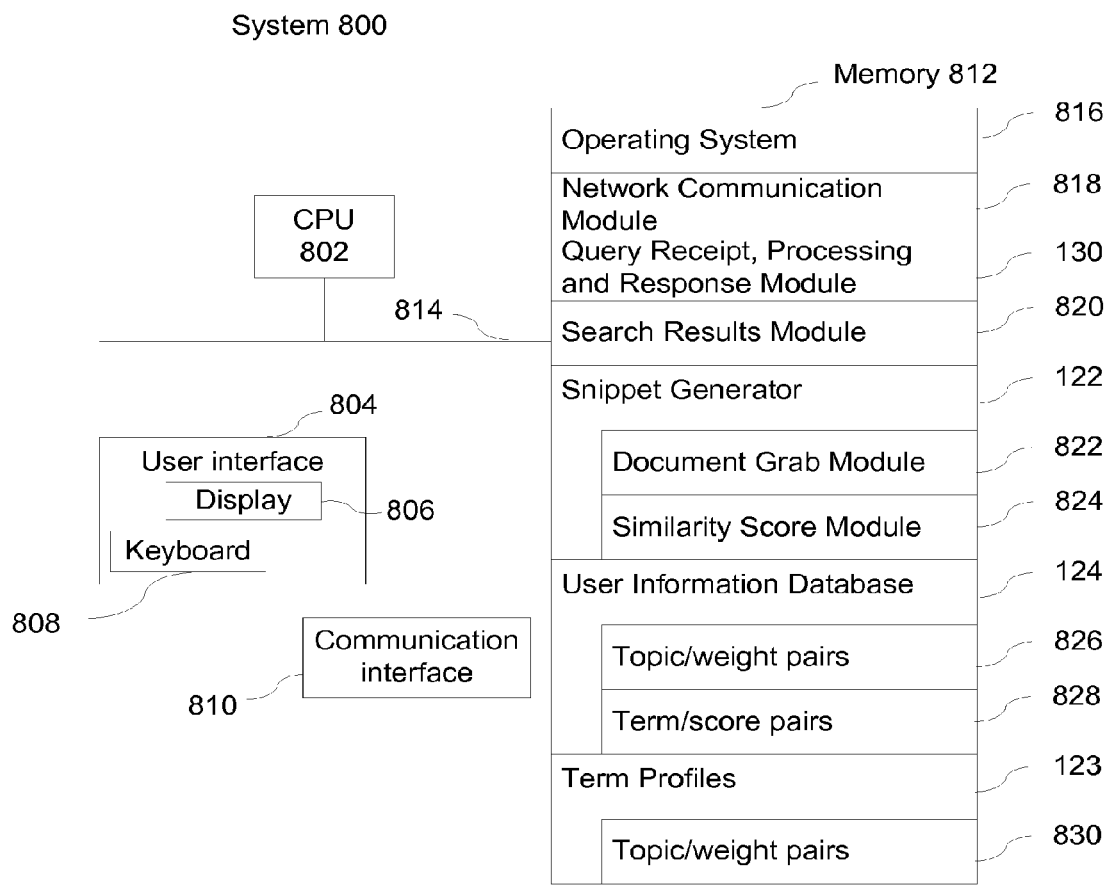
FIG. 8 is a computer system in accordance with some embodiments of the present invention.

FIG. 8 is a block diagram of a system 800 which may implement some of the embodiments of the invention. The system 800 generally includes one or more processing units (CPUs) 802, one or more network or other communications interfaces 810, a memory 812, and one or more communication buses 814 for interconnecting these components. The system 800 may optionally include a user interface 804, for instance a display 806 and a keyboard 808. The memory 812 may include high speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 812 may optionally include one or more storage devices remotely located from the CPU(s) 802. In some embodiments, the memory 812 stores the following programs, modules and data structures, or a subset thereof:
- an operating system 816 that includes procedures for handling various basic system services and for performing hardware dependent tasks;
- a network communication module 818 that is used for connecting the system 800 to other computers via the one or more communication network interfaces 810 (wired or wireless), such as the Internet, other wide area networks, local area networks, metropolitan area networks, and so on;
- a query receipt, processing, and response module 130 (or program or set of instructions) for receiving and processing queries as described above;
- a search results module 820 (or program or set of instructions) for obtaining search results which are relevant to a search query as described above;
- a snippet generator 122 (or program or set of instructions), including a document grab module 822 for obtaining the text of a document and a similarity score module 824 for determining a similarity score between a term and a user profile as described above;
- a user information database 124 for storing user profiles including one or more topic-based user profiles 826 containing topic and weight pairs as described above and/or one or more term-based user profiles 828 including terms and their scores as described above; and
- term profiles 123 that include one or more topic-based term profiles 830 for one or more terms found in documents including one or more pairs of topics and their corresponding weights as described above.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, the memory 812 may store a subset of the modules and data structures identified above. Furthermore, the memory 812 may store additional modules and data structures not described above.

Although FIG. 8 shows a "system 800," FIG. 8 is intended more as functional description of the various features which may be present in a computing system or set of systems than as a structural schematic of the embodiments described herein. In practice, and as recognized by those of ordinary skill in the art, items shown separately could be combined and some items could be separated. For example, some items shown separately in FIG. 8 could be implemented on single servers and single items could be implemented by one or more servers. The actual number of servers used for an implementation and how features are allocated among a plurality of them will vary from one implementation to another, and may depend in part on the amount of data traffic that the system must handle during peak usage periods as well as during average usage periods.

In some embodiments, the invention can include a computer program product for use in conjunction with a computer system, the computer program product including a computer readable storage medium and a computer program mechanism embedded therein, the computer program mechanism including instructions for identifying at least one item having a content, and instructions for generating a personalized snippet for the item in accordance with information associated with the user.

In some embodiments, a system for processing messages can include a main memory and a processor. The system can also include at least one program, stored in the main memory and executed by the processor, the at least one program including instructions for identifying at least one item having a content, and instructions for generating a personalized snippet for the item in accordance with information associated with the user.

Although described above with reference to generating snippets of items returned in response to an explicit search request from a user, snippets can be generated in response to other types of explicit or implicit search requests, or to actions which are not primarily based on a search. For example, snippets for one or more messages in a message view window (e.g., an email inbox view) can be based on the user's profile without reference to any explicit user search request. In some applications, an inbox view itself is an implicit search of messages having an inbox label. Snippets can also be generated in response to various non-search activities such as a display of the contents of a directory.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. For example, users may belong to a community of users (e.g., researchers in a chemistry lab) which may have a community profile. This community profile may be used in place of or in combination with the user's own profile. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method comprising:
receiving an implicit search request associated with a user;
obtaining a user profile corresponding to the user, wherein the user profile is generated based in part on the user's prior computing activities, the prior computing activities including one or more of browsing, searching, and messaging;
generating, in accordance with the obtained user profile, a personalized snippet of a document responsive to the implicit search request, the snippet comprising a text portion of the document chosen based on one or more terms of the obtained user profile; and
providing the personalized snippet of the document for display to the user,
wherein the generating includes identifying content associated with the document, determining a profile similarity score for a term in the content, and generating the snippet based at least in part on the term when the profile similarity score is above a threshold, and
wherein determining the profile similarity score includes identifying a respective term profile associated with the at least one term and determining a similarity between the profile information associated with the user profile and the respective term profile.

2. The method of claim 1, wherein determining the profile similarity score comprises obtaining the profile similarity score for the at least one term from a look up table.

3. The method of claim 1, wherein each of the profile information associated with the user profile and the respective term profile are represented as a vector of a plurality of profile categories and respective weights, and wherein determining the similarity between the profile information associated with the user profile and the respective term profile comprises computing a distance between the vector corresponding to the profile information associated with the user profile and the vector corresponding to the respective term profile.

4. The method of claim 1, wherein information associated with the user profile and information associated with the respective term profile are each represented as a plurality of profile categories and respective weights.

5. The method of claim 1, wherein the document includes a message in a message view window.

6. The method of claim 1, wherein the implicit search request includes displaying contents of a directory and wherein the document includes a document contained in the directory.

7. A non-transitory computer readable storage medium storing one or more programs configured to be executed by a system, the one or more programs comprising instructions for:
receiving an implicit search request associated with a user;
obtaining a user profile corresponding to the user, wherein the user profile is generated based in part on the user's prior computing activities, the prior computing activities including one or more of browsing, searching, and messaging;
generating, in accordance with the obtained user profile, a personalized snippet of a document responsive to the implicit search request, the snippet comprising a text portion of the document chosen based on one or more terms of the obtained user profile; and
providing the personalized snippet of the document for display to the user,
wherein the generating includes identifying content associated with the document, determining a profile similarity score for a term in the content, and generating the snippet based at least in part on the term when the profile similarity score is above a threshold, and
wherein determining the profile similarity score includes identifying a respective term profile associated with the at least one term and determining a similarity between the profile information associated with the user profile and the respective term profile.

8. The storage medium of claim 7, wherein determining the profile similarity score comprises obtaining the profile similarity score for the at least one term from a look up table.

9. The storage medium of claim 7, wherein each of the profile information associated with the user profile and the respective term profile are represented as a vector of a plurality of profile categories and respective weights, and wherein determining the similarity between the profile information associated with the user profile and the respective term profile comprises computing a distance between the vector corresponding to the profile information associated with the user profile and the vector corresponding to the respective term profile.

10. The storage medium of claim 7, wherein information associated with the user profile and information associated with the respective term profile are each represented as a plurality of profile categories and respective weights.

11. The storage medium of claim 7, wherein the document includes a message in a message view window.

12. The storage medium of claim 7, wherein the implicit search request includes displaying contents of a directory and wherein the document includes a document contained in the directory.

13. A system comprising:
memory;
one or more processors; and
one or more programs, stored in the memory and executed by the one or more processors, the one or more programs including instructions for:
receiving an implicit search request associated with a user;
obtaining a user profile corresponding to the user, wherein the user profile is generated based in part on the user's prior computing activities, the prior computing activities including one or more of browsing, searching, and messaging;
generating, in accordance with the obtained user profile, a personalized snippet of a document responsive to the implicit search request, the snippet comprising a text portion of the document chosen based on one or more terms of the obtained user profile; and
providing the personalized snippet of the document for display to the user,
wherein the generating includes identifying content associated with the document, determining a profile similarity score for a term in the content, and generating the snippet based at least in part on the term when the profile similarity score is above a threshold, and wherein determining the profile similarity score includes identifying a respective term profile associated with the at least one term and determining a similarity between the profile information associated with the user profile and the respective term profile.

14. The system of claim 13, wherein determining the profile similarity score comprises obtaining the profile similarity score for the at least one term from a look up table.

15. The system of claim 13, wherein each of the profile information associated with the user profile and the respective term profile are represented as a vector of a plurality of profile categories and respective weights, and wherein determining the similarity between the profile information associated with the user profile and the respective term profile comprises computing a distance between the vector corresponding to the profile information associated with the user profile and the vector corresponding to the respective term profile.

16. The system of claim 13, wherein the profile information associated with the user profile and information associated with the respective term profile are each represented as a plurality of profile categories and respective weights.

17. The system of claim 13, wherein the document includes a message in a message view window.

18. The system of claim 13, wherein the implicit search request includes displaying contents of a directory and wherein the document includes a document contained in the directory.

* * * * *